United States Patent

Abraham, Sr. et al.

[11] Patent Number: 5,934,174
[45] Date of Patent: Aug. 10, 1999

[54] LIGHTWEIGHT ARTICULATED PISTON HEAD AND METHOD OF MAKING THE PISTON HEAD

[75] Inventors: Norbert Abraham, Sr., Columbus, Ind.; Carmo Ribeiro, Ann Arbor, Mich.

[73] Assignee: Cummins Engine Company, Inc., Columbus, Ind.

[21] Appl. No.: 09/165,205

[22] Filed: Oct. 2, 1998

[51] Int. Cl.⁶ .................................................. B01D 45/00
[52] U.S. Cl. ............................ 92/222; 92/231; 123/193.6
[58] Field of Search ............................. 92/216, 219, 222, 92/231; 123/193.6

[56] References Cited

U.S. PATENT DOCUMENTS

| | | | |
|---|---|---|---|
| 3,613,521 | 10/1971 | Itano | 92/231 X |
| 3,915,141 | 10/1975 | Öttl et al. | |
| 4,577,595 | 3/1986 | Deutschmann et al. | |
| 4,581,983 | 4/1986 | Moebus | |
| 5,040,454 | 8/1991 | Ballheimer et al. | |
| 5,081,968 | 1/1992 | Bruni | |
| 5,115,726 | 5/1992 | Daxer et al. | 92/219 |
| 5,144,884 | 9/1992 | Kelly | |
| 5,207,147 | 5/1993 | Leites et al. | |
| 5,279,268 | 1/1994 | Brink et al. | |
| 5,289,758 | 3/1994 | Berlinger | |
| 5,359,922 | 11/1994 | Leites et al. | 92/222 X |
| 5,394,788 | 3/1995 | Mendes et al. | |
| 5,692,430 | 12/1997 | McLaughlin et al. | 92/219 X |
| 5,724,933 | 3/1998 | Silvonen et al. | |

FOREIGN PATENT DOCUMENTS 380800 10/1932 United Kingdom.

OTHER PUBLICATIONS

Carmo Ribeiro et al., "Articulated Piston," U.S. Patent Application Serial No. 689,244, filed Aug. 7, 1996. pp. 1–22.

Primary Examiner—Hoang Nguyen
Attorney, Agent, or Firm—Sixbey, Friedman, Leedom & Ferguson, P.C.

[57] ABSTRACT

A piston head is provided which is lightweight and inexpensive yet capable of handling high mechanical and thermal loading during operation. The piston head generally includes a top head portion and a bottom head portion formed separately and connected by a friction weld. Importantly, the top head portion includes a first cooling gallery formed between the depending outer wall and a first inner depending wall and a second cooling gallery formed between the first inner depending wall and a second inner depending wall. The bottom head portion also includes corresponding first and second upper extending walls connected to the first and second inner depending walls to form the lower portion of each cooling gallery. The inner depending and upper extending walls are formed so that the ratio of the sum of the transverse thickness of the adjacent walls to the outer diameter of the piston head is approximately from 2% to 8%, and preferably 4% to 6%. This ratio optimal reduces piston weight while maintaining sufficient strength to endure mechanical loading during operation and providing improved thermal cooling capacity.

23 Claims, 4 Drawing Sheets

LIGHTWEIGHT ARTICULATED PISTON HEAD AND METHOD OF MAKING THE PISTON HEAD

TECHNICAL FIELD

This invention relates to articulated piston assemblies for diesel engines, and particularly to an articulated piston head and a method of manufacturing the piston head which minimizes complexity and costs while resulting in a lightweight head capable of handling high loads.

BACKGROUND OF THE INVENTION

Competitive pressures have increased the reliability and durability requirements for heavy duty diesel engines. In addition, performance and exhaust emission improvements have increased the thermal and mechanical loading on critical heavy duty diesel engine components.

To meet such requirements, the use of articulated pistons has grown in recent years. Conventional articulated pistons generally comprise a piston head and a separate piston skirt connected to both the piston head and a small end of a connecting rod by a common wrist pin. The piston head includes a combustion chamber formed in an end face and a hollow cavity for cooling the head. The hollow cavity is positioned between the combustion chamber and a peripheral pending leg which receives piston rings on its outer surface. Also, an annular rib extends from the inner surface of the head opposite the pending leg to surround the hollow cavity. The annular rib also joins the head to a pair of pin bosses with aligned holes for receiving the wrist pin.

For the purpose of improving the cooling of the piston head, a tray or trough is provided at the upper portion of the piston skirt. The tray opens towards the hollow cavity so as to partially close this cavity, thus forming what is known as a cooling gallery. When the engine is running, a cooling liquid such as lubricating oil is injected by a nozzle against the cooling gallery, through an oil inlet provided axially along the tray, thus partially removing heat from that region. The oil, impinging against the hollow cavity, flows down for collection by the tray. Due to the reciprocating motion of the piston, oil collected from the cavity is thrown against and around the cooling gallery thereby increasing the removal of heat from that region.

Piston assemblies as described hereinabove are disclosed in many prior letters patents, such as U.S. Pat. Nos. 5,144,884 issued to Kelly and 5,115,726 issued to Daxer et al., and U.S. patent application Ser. No. 689,244, filed Aug. 7, 1996.

Such conventional assemblies have shown good performance even when operating under severe conditions, such as very high temperatures and pressures and/or very high speeds, as often experienced in modern diesel engines. Although meeting the majority of current specifications, trends in this field have pointed out the need to reduce the weight and cost of such pistons to increase the power made available by the engine and to place the engine at a more competitive level in the market. In addition, many future engines will have increased specific power and pressures applied to the pistons.

U.S. Pat. Nos. 3,915,141 to Ottl et al. and 5,279,268 issued to Brink et al. both disclose articulated piston assemblies including a piston head connected to a skirt by one or more threaded fasteners. However, the use of fasteners increases manufacturing and assembly costs. Moreover, fasteners may not provide a sufficiently durable connection under high speed conditions.

U.S. Pat. Nos. 5,394,788 to Mendes et al. and 5,207,147 to Leites et al. both disclose articulated pistons including a piston head formed from two separate forged pieces which are welded together by, for example, friction welding. The piston head includes an annular rib forming one wall of an annular cooling cavity. However, the annular rib is formed with an excessively large thickness resulting in an undesirably heavy piston.

Consequently, there is a need for a lightweight piston head for an articulated piston assembly capable of handled high loads without undue distortion and a method for manufacturing the piston head which minimizes the costs and assembly time.

SUMMARY OF THE INVENTION

It is an object of the present invention, therefore, to overcome the disadvantages of the prior art and to provide a piston head having reduced weight yet high durability and reliability.

A further object of the present invention to provide a lightweight piston head weighing approximately 20–30% less than conventional piston heads.

It is a further object of the present invention to provide a piston head capable of handling high thermal loading while providing sufficient load carrying capability.

Yet another object of the present invention to provide a piston head which contains minimal wall thickness while permitting the head to be effectively formed using friction welding.

A still further object of the present invention is to provide a piston head which can be inexpensively formed by machining portions of the head to a final thickness prior to friction welding.

Another object of the present invention is to provide a lightweight, inexpensive piston head for an articulated piston assembly which is formed of two blanks friction welded together.

Still another object of the present invention is to provide a lightweight, inexpensive piston head formed by friction welding which includes dual cooling galleries.

Yet another object of the present invention is to provide a method of making a piston head having a first blank with dual cooling galleries formed by two thin walls which includes friction welding the walls to a second blank.

It is yet another object of the present invention is to provide an inexpensive, simple method of making a piston head for an articulated piston assembly which includes machining two walls of one blank to a predetermined final thickness prior to friction welding the first blank to a second blank.

These and other objects of the present invention are achieved by providing a piston head for an articulated piston assembly including a skirt connected to the head by a pin, comprising a top head portion having an upper wall, a depending outer wall extending from the upper wall, a first inner depending wall positioned a spaced transverse distance from the depending outer wall, a first cooling gallery positioned between the depending outer wall and the first inner depending wall, a second inner depending wall positioned a spaced transverse distance from the first inner depending wall and a second cooling gallery positioned between the first and second inner depending walls. The piston head also includes a bottom head portion having a pair of support portions connected to the top head portion and spaced inwardly from the depending outer wall. A friction weld connects the bottom head portion to the first and the second inner depending walls so as to connect the top head portion to the bottom head portion. The top head portion includes an outer diameter while the first and the second inner depending walls each include a transverse thickness. The piston head is designed so that a ratio of a sum of the transverse thickness of the first inner depending wall and the transverse thickness of the second inner depending wall to the outer diameter is approximately from 2% to 8%. Preferably, the ratio of the sum of the transverse thicknesses to the outer diameter is approximately from 4% to 6%. The bottom head portion may include a first upper extending wall connected to the first inner depending wall of the top head portion by the friction weld and a second upper extending wall connected to the second inner depending wall of the top head portion by the friction weld. Each of the support portions of the bottom head portion may include a transverse bore for receiving the pin of the articulated piston assembly. Also, the second cooling gallery may include an opening facing the support portions. Alternatively, the second cooling gallery may be closed on all sides. Preferably, the second cooling gallery extends annularly completely around an axis of the piston head.

The present invention is also directed to a method of making a piston head for an articulated piston assembly, comprising the steps of providing a top head blank, forming a first cooling gallery in the top head blank and forming a second cooling gallery in the top head blank between the first cooling gallery and a central axis of the piston head. The first and second cooling galleries are separated by a first inner depending wall. The central axis and the second cooling gallery are separated by a second inner depending wall. The method also includes providing a bottom head blank and, importantly, friction welding the bottom head blank to the top head blank to create a friction weld connecting the first and the second inner depending walls to the bottom head blank. The bottom head blank may include a first upper extending wall for connection to the first inner depending wall of the top head blank by the friction weld and a second upper extending wall for connection to the second inner depending wall of the top head blank by the friction weld.

The method may further include the step of machining the first and the second inner depending walls to a respective predetermined transverse thickness prior to friction welding. The predetermined transverse thickness is machined so that the ratio of a sum of the predetermined transverse thickness of the first inner depending wall and the predetermined transverse thickness of the second inner depending wall to the outer diameter of the top head blank is approximately from 2% to 8%. The method may also include the step of machining the first and the second upper extending walls of the bottom head blank to a respective predetermined transverse thickness prior to friction welding. Again, the ratio of the sum of the predetermined transverse thicknesses of the first upper extending wall and the second upper extending wall to the outer diameter is approximately from 2% to 8%. The method may further include the steps of forming the top head blank and the bottom head blank by forging and forming a central recess adjacent the second inner depending wall. The top head blank preferably includes a combustion chamber formed on an opposite side from the central recess.

BRIEF DESCRIPTION OF THE DRAWINGS

FIG. 1b is a bottom view of the piston head of FIG. 1a;

FIG. 2b is a bottom view of the piston head of FIG. 2a;

DETAILED DESCRIPTION OF THE INVENTION

Figure 1A:
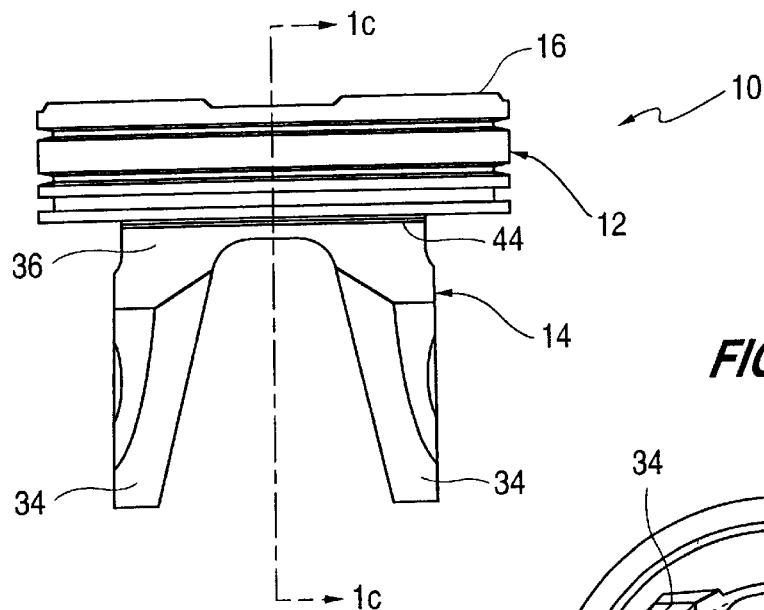
FIG. 1a a side view of a first embodiment of the piston head of the present invention.
Figure 1B:
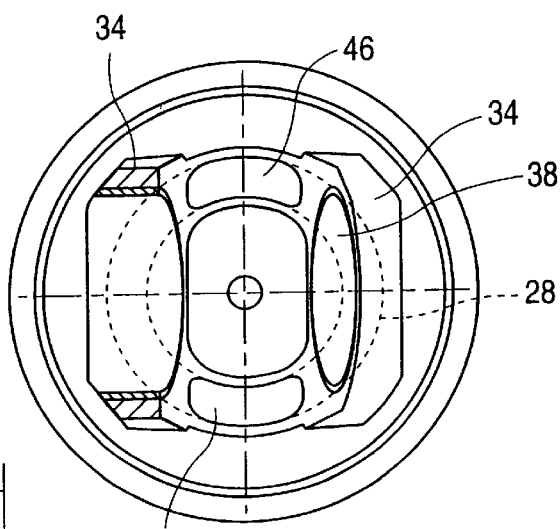
Figure 1C:
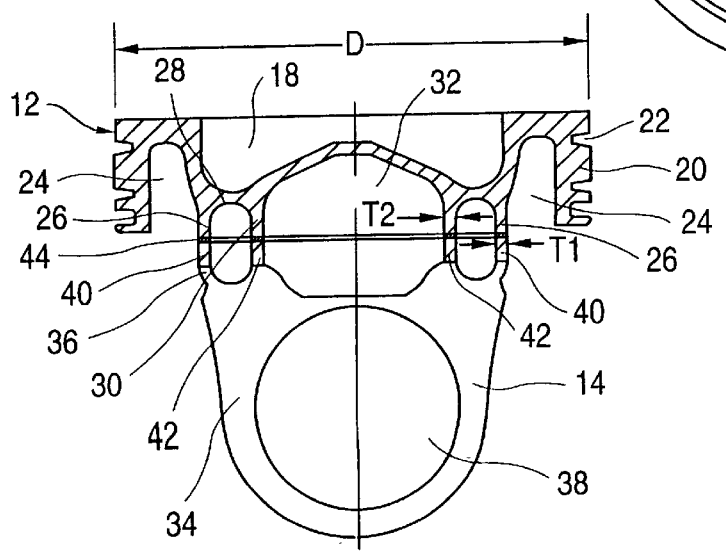
FIG. 1c is a cross-sectional view of the piston head of FIG. 1a taken along plane 1c—1c.

Referring to FIGS. 1a–1c, there is shown the piston head of the present invention, indicated generally at 10, manufactured by the method of the present invention for use in an articulated piston assembly of an internal combustion engine, i.e. diesel engine. Piston head 10 generally includes a top head portion 12 and a bottom head portion 14 formed separately and friction welded together using the method of the present invention as described more fully hereinbelow. Piston head 10 of the present invention provides improved cooling capacity and high load capability while importantly substantially reducing piston head weight and cost.

Top head portion 12 includes an upper wall 16 having a combustion recess 18 formed therein and a peripheral depending outer wall 20. Depending outer wall 20 includes a series of outwardly bearing ring grooves 22 for receiving piston rings (not shown). Top head portion 12 also includes a first cooling gallery 24 formed in its lower surface and extending annularly around top head portion 12. First cooling gallery 24 is positioned adjacent to, and partially defined by, depending outer wall 20 on one side. On the opposite side, a first inner depending wall 26 extends downwardly from upper wall 16 toward bottom head portion 14. Top head portion 12 also includes a second cooling gallery 28 extending annularly around top head portion 12 and positioned radially inwardly from first cooling gallery 24. Second cooling gallery 28 is defined in part by first inner depending wall 26 and a second inner depending wall 30 extending annularly around the central axis of piston head 10 and positioned a spaced distance from first inner depending wall 26. First and second inner depending walls 26 and 30, respectively, preferably extend generally parallel to the longitudinal and reciprocating axis of piston head 10. Second cooling gallery 28 is also partially formed by bottom head portion 14 as discussed more fully hereinbelow. A central recess 32 is formed in the lower surface of piston head 10 inwardly of second inner depending wall 30.

As shown in FIGS. 1a and 1b, bottom head portion 14 includes a pair of support portions 34 extending from a base portion 36. Referring to FIG. 1c, each support portion 34 includes a transverse bore 38 for receiving a wrist pin (not shown) which connects piston head 10 to a separate piston skirt (not shown) to form an articulated piston assembly. Piston head 10 of the present invention may be used in any articulated piston assembly utilizing a wrist pin to connect the piston skirt to piston head 10, such as disclosed in U.S. Pat. No. 5,144,884, the entire contents of which is hereby incorporated by reference. Base portion 36 of bottom head portion 14 includes a first upper extending wall 40 and a second upper extending wall 42 positioned a spaced distance radially inward from first upper extending wall 40. Preferably, first and second upper extending walls 40, 42 extend generally parallel to the longitudinal and reciprocating axis of piston head 10. Also, first upper extending wall 40 and second upper extending wall 42 are rigidly connected to first inner depending wall 26 and second inner depending wall 30, respectively, by a friction weld 44. As discussed more fully hereinbelow, the use of friction weld 44 in combination with the sizing of first and second inner depending walls 26 and 30 and first and second upper extending walls 40 and 42, results in substantial weight reduction while maintaining high load capability and optimal thermal performance. Thus, it can be seen that first and second inner depending walls 26, 30 and first and second upper extending walls 40, 42 form second cooling gallery 28. In addition, openings 46 are provided in base portion 36 of bottom head portion 14 between support portions 34 for allowing cooling fluid to flow into and out of second cooling gallery 28.

Piston head 10 of the present invention is specifically designed to minimize piston head weight while ensuring high load capability and effective thermal cooling capacity. Specifically, piston head 10 advantageously includes the combination of dual cooling galleries, i.e. first and second cooling galleries 24, 28, respectively, first and second inner depending walls 26, 30, first and second upper extending walls 40 and 42 formed of a predetermined transverse thickness, and friction weld 44 connecting top head portion 12 to bottom head portion 14. Specifically, first inner depending wall 26 is formed with a predetermined transverse thickness T1 and second inner depending wall 30 formed with a predetermined transverse thickness T2 which minimize the material used to form top head portion 12 while ensuring a durable and reliable connection to bottom head portion 14 by friction weld 44 and providing sufficient capacity to endure the combustion loads during operation in an engine. Preferably, first upper extending wall 40 and second upper extending wall 42 also are formed with predetermined transverse thicknesses T1 and T2, respectively, to maximize weight reduction while maintaining adequate load carrying capacity. Predetermined transverse thicknesses T1 and T2 are chosen so that the ratio of the sum of T1 and T2 to the outer diameter D of piston head 10 is approximately from 2% to 8% of piston diameter D. Moreover, the ratio is preferably from 4% to 6% for optimum weight reduction and load capacity. Applicants have found that a ratio percentage outside the given range creates less than optimal weight reduction and/or load carrying capacity. Moreover, the predetermined transverse thickness of the walls effects the thermal cooling capacity of first and second cooling galleries 24 and 28. The depending and extending walls are capable of being formed with a relatively small transverse thickness due to the use of friction weld 44 for connecting the bottom head and top head portions 14 and 12, respectively. Friction weld 44 permits an effective connection between top head portion 12 and bottom head portion 14 without the necessity of thick wall portions typically necessary for accommodating fasteners or creating sufficient structural integrity. By designing piston head 10 with depending and extending walls having the predetermined transverse thicknesses T1 and T2, respectively, and using friction weld 44, the load carrying capacity of piston head 10 is maintained at a high level while substantially reducing the weight of the assembly and increasing the thermal cooling capacity by providing the dual cooling galleries. Applicants have found that the total weight reduction ranges between 20% and 30% from a conventional piston head.

The use of first cooling gallery 24 and second cooling gallery 28 in combination with openings 46 creates a multiple cooling system for cooling piston head 10 during engine operation. The first cooling source includes a cooling liquid, such as lubricating oil, injected by a nozzle (not shown) into first cooling gallery 24 and into second cooling gallery 28 through openings 46. The oil impinges against the walls forming first cooling gallery 24 and second cooling gallery 28 and flows down for collection by a suitable collection means formed in, for example, the piston skirt (not shown). Thus, the oil partially removes heat from depending outer wall 20, first inner depending wall 26 and first upper extending wall 40. Due to the reciprocating motion of the piston during operation, oil collected from first cooling gallery 24 is shaken and projected with the aid of the collection means thereby increasing the removal of heat from the walls. Of course, nozzles may be used to direct lubricating oil onto the lower wall forming central recess 32 by directing a stream of fluid between support portions 34.

A second cooling source is provided by the portions of depending walls 26, 30 and extending walls 40, 42 forming second cooling gallery 28 located immediately above support portions 34. The portion of second cooling gallery 28 formed by these walls functions as an "air box" extracting heat from the portion of the piston head forming the side surfaces of central recess 32 and the upper wall forming combustion recess 18. That is, the surface area of the lower wall of top piston head 12 is increased by the width of second cooling gallery 28 in comparison to a single cooling gallery design thereby increasing the cooling capacity of the piston head. Advantageously, the air box will have limited exposure to heated cooling oil and therefore may increase cooling properties. A third improved cooling source is derived from the reduced transverse thickness of depending walls 26 and 28 and extending walls 40 and 42. By minimizing the thickness of these walls, a radiating fin effect is created further enhancing thermal dissipation.

Figure 2A:
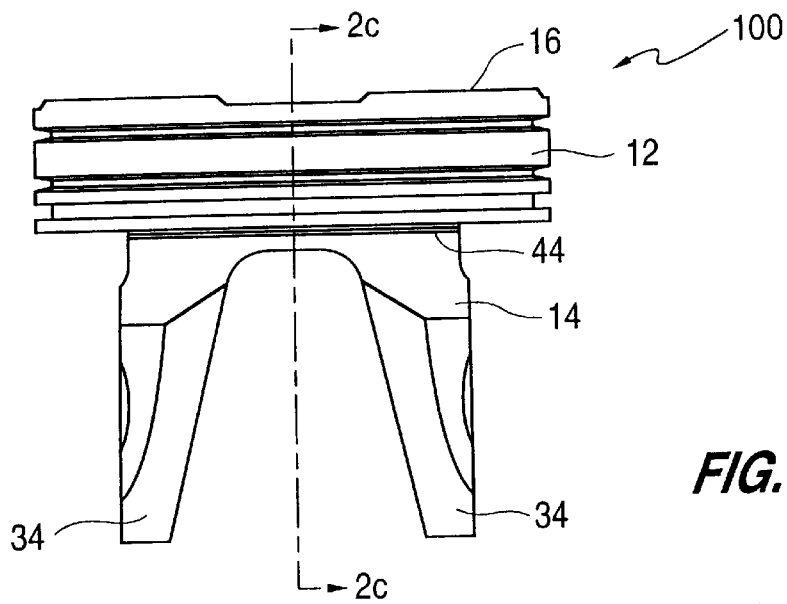
FIG. 2a a side view of a second embodiment of the piston head of the present invention.
Figure 2B:
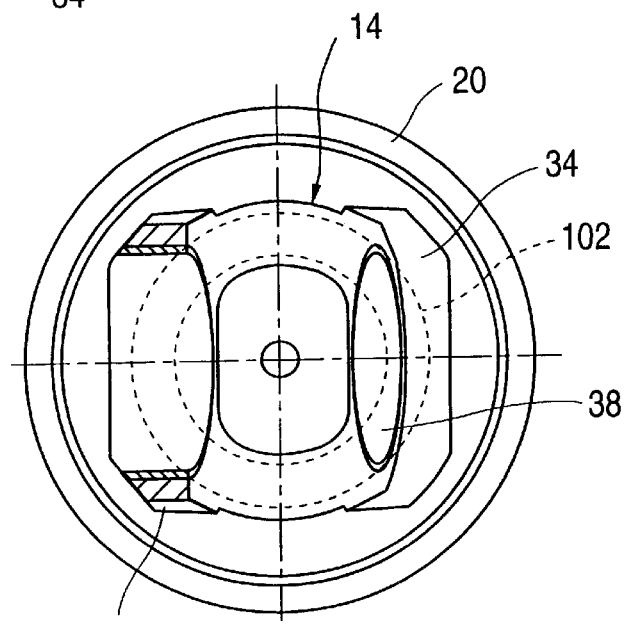
Figure 2C:
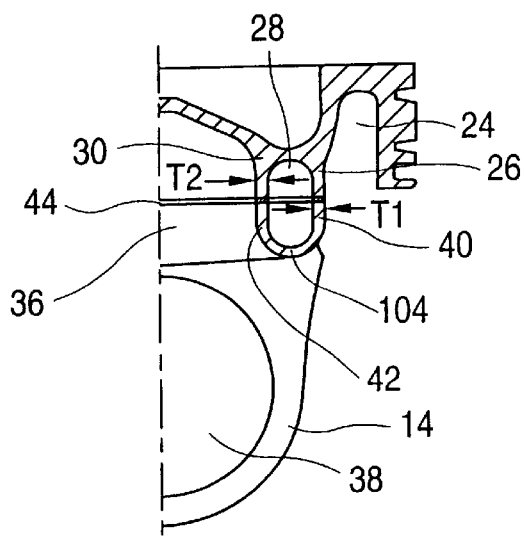
FIG. 2c is a cross-sectional view of the piston head of FIG. 2a taken along plane 2c—2c.

FIGS. 2a–2c illustrate a second embodiment of the piston head of the present invention indicated generally at 100 which is the same as the piston head 10 of the previous embodiment except that a second cooling gallery 102 is formed so as to be completely closed on all sides around its entire annular extent. In this embodiment, features of the present embodiment which are the same as the previous embodiment will be referred to with like reference numerals. As clearly shown in FIGS. 2b and 2c, the present embodiment does not include openings in the lower surface of base portion 36. Instead, the lower surface of base portion 36 extends across the lower portion of second cooling gallery 102 so as to integrally connect first upper extending wall 40 and second upper extending wall 42. As a result, closed second cooling gallery 102 functions as a "air box" around its entire annular extent. Importantly, the use of a bottom wall 104 adds significant structural reinforcement to piston head 100. Accordingly, the present embodiment is intended for use in applications involving greater mechanical loading and moderate thermal loading, while the embodiment of FIGS. 1a–1c may best be suited for high thermal load applications experiencing moderate mechanical load conditions. The design features and advantages of the first embodiment with respect to the transverse thicknesses of the depending and extending walls and friction weld 44 are likewise applicable to the present embodiment of FIGS. 2a–2c as discussed hereinabove with respect to the first embodiment.

Figure 3A:
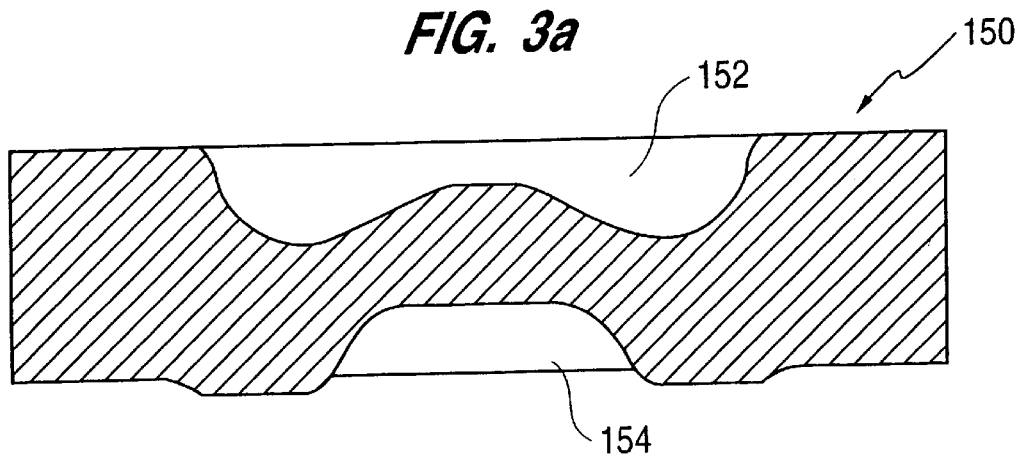
FIG. 3a is a cross-sectional view of the top head portion of the piston head during the method of the present invention prior to friction welding.
Figure 3B:
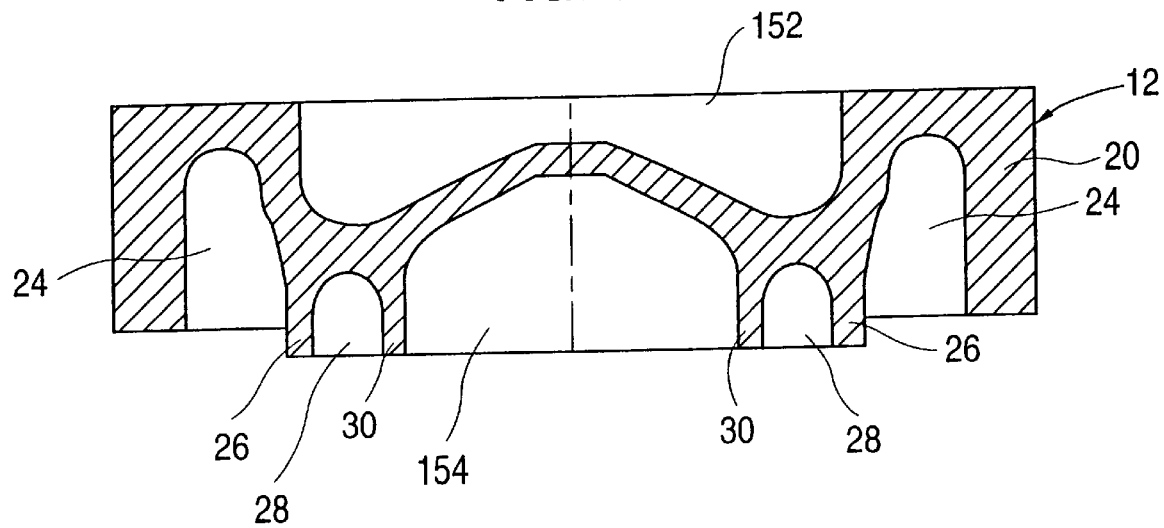
FIG. 3b is a cross-sectional view of the top head portion of the piston head during the method of the present invention as machined prior to friction welding.
Figure 4A:
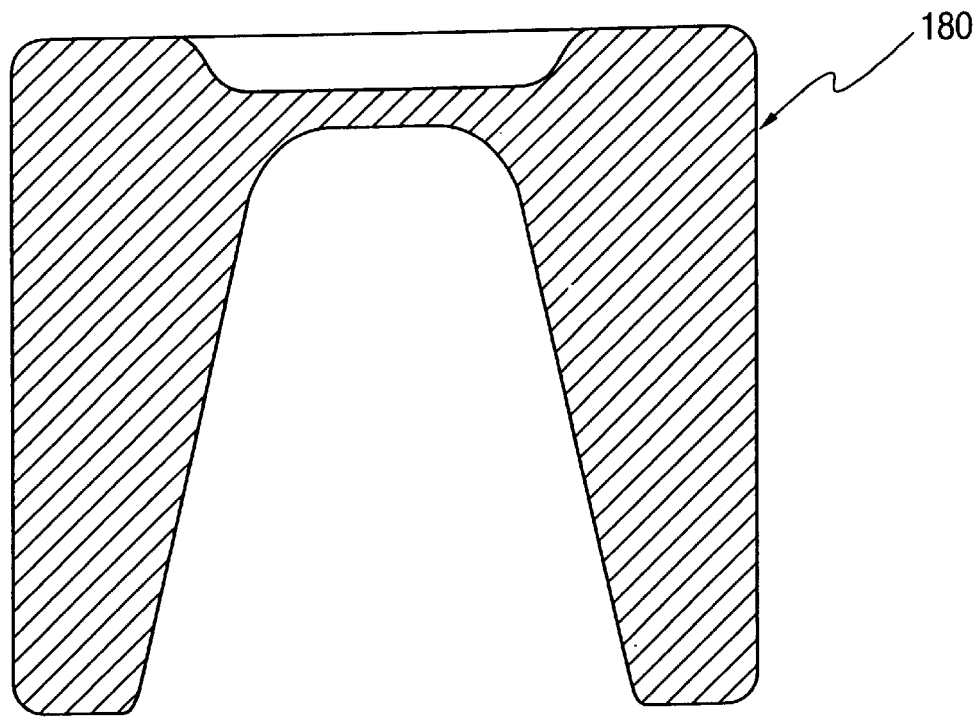
FIG. 4a is a cross-sectional view of the bottom portion of the piston head during the method of the present invention prior to friction welding.
Figure 4B:
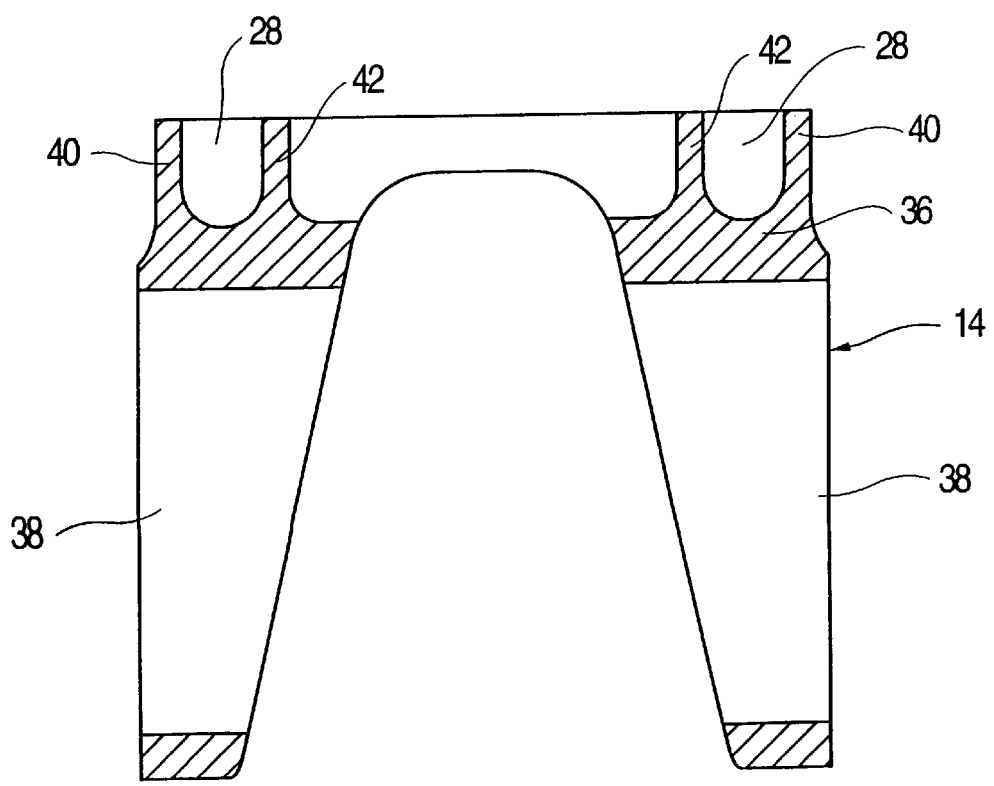
FIG. 4b is a cross-sectional view of the bottom portion of the piston head during the method of the present invention as machined prior to friction welding.

The present invention is also directed to a novel method of manufacturing the piston head 10, 100 of the present invention. Referring to FIGS. 3a and 4a, a top head blank 150 and a bottom head blank 180 are first formed by, for example, forging, in an inexpensive and conventional manner to provide high strength, durable blanks. Preferably, the blanks are formed of any high strength material, such as a steel alloy, i.e. SAE 4140. Top head blank 150 includes a partial combustion recess 152 and a partial central recess 154 formed opposite combustion recess 152. Top head blank 150 is then pre-machined, prior to friction welding to bottom head blank 180, to form first cooling gallery 24 and second cooling gallery 28. Also, partial combustion recess 152 is machined closer to its final size. Importantly, partial central recess 154 is machined to its final size prior to friction welding since the machining of central recess 154 after friction welding to bottom head blank 180 is impractical. Also, prior to friction welding, first inner depending wall 26 and second inner depending wall 30 are machined to their final respective predetermined transverse thicknesses T1 and T2. Also, bottom head blank 180 is pre-machined so as to form first and second upper extending walls 40, 42 respectively. Importantly, prior to friction welding, first and second upper extending walls 40 and 42 are finally machined to the respective predetermined transverse thicknesses T1 and T2 as shown in FIG. 4b. Moreover, transverse bores 38 may be formed in bottom head blank 180 prior to friction welding or alternatively after friction welding. Preferably, transverse bores 38 are formed in support portions 34 to an approximate dimension prior to friction welding and then further machined to within acceptable tolerances after friction welding. It should be noted that openings 46 may be provided in bottom head blank 180 by the forging process or machined in bottom head blank 180 prior to or after friction welding. The top head blank 150 and bottom head blank 180 of FIGS. 3b and 4b are then friction welded together into the position shown in FIGS. 1c and 2c with first and second inner depending walls 26 and 30 friction welded to first and second upper extending walls 40 and 42, respectively. Subsequent to friction welding, the upper wall forming combustion recess 18 may be machined to a final dimension enlarging combustion recess 18 and reducing the thickness of the wall between combustion recess 18 and both central recess 32 and first cooling gallery 24 to an appropriate dimension to achieve weight reduction and optimum thermal cooling while maintaining structural integrity. Also, subsequent to friction welding, transverse bores 38 may be machined to the final dimensions and ring grooves 22 formed in the outer surface of depending outer wall 20. It may also be desirable to remove the post friction welding debris or scale formed at the friction weld 44 without affecting the transverse thicknesses T1, T2.

Thus, the method of the present invention for forming piston head 10, 100 simply and inexpensively creates a piston head 10, 100 having optimal weight reduction, high mechanical loading capability and effective thermal loading capability. Piston head 10, 100 is much lighter in weight than conventional friction welded piston heads since a significant portion of the piston head material is removed to form second cooling gallery 28 and the relatively thin inner depending walls 26, 30 and upper extending walls 40, 42. Moreover, by forming inner depending walls 26, 30 and upper extending walls 40, 42 with predetermined transverse thicknesses T1 and T2 so that the ratio of the sum of transverse thicknesses T1 and T2 to the outer diameter D of piston head 10, 100 is approximately 2% to 8%, and preferably 4% to 6%, the weight of piston head 10, 100 is optimally reduced while maintaining the structural integrity of the piston head due to the required ratio. Applicants have determined that by combining the required ratio with the inner depending and upper extending walls positioned and formed as shown in FIGS. 1c and 2c, the weight of piston head 10 can be substantially reduced while still maintaining the wall strength within piston head 10, 100 required to withstand the high mechanical loading experienced in heavy duty diesel engines. Moreover, by forming the thin walled sections, second cooling gallery 28 is synergistically formed to advantageously create increased thermal cooling capacity.

Industrial Applicability

The piston head of the present invention for use with articulated piston assemblies is designed for use in reciprocating piston internal combustion engines of various designs. The present piston head and method of manufacturing the piston head are particularly suitable for heavy duty diesel engines used in truck and automotive vehicles as well as industrial applications, for example stationary power plants, especially where a reduction in piston weight is advantageous to engine operation and efficiency.

We claim:

1. A piston head for an articulated piston assembly including a skirt connected to the head by a pin, comprising:

a top head portion having an upper wall, a depending outer wall extending from said upper wall, a first inner depending wall positioned a spaced transverse distance from said depending outer wall, a first cooling gallery positioned between said depending outer wall and said first inner depending wall, a second inner depending wall positioned a spaced transverse distance from said first inner depending wall, and a second cooling gallery positioned between said first inner depending wall and said second inner depending wall;

a bottom head portion having a pair of support portions connected to said top head portion and spaced inwardly from said depending outer wall; and a friction weld connecting said bottom head portion to said first and said second inner depending walls.

2. The piston head of claim 1, wherein said top head portion includes an outer diameter, said first and said second inner depending walls each including a transverse thickness, wherein a ratio of a sum of said transverse thickness of said first inner depending wall and said transverse thickness of said second inner depending wall to said outer diameter is approximately from 2% to 8%.

3. The piston head of claim 2, wherein said ratio is from 4% to 6%.

4. The piston head of claim 1, wherein said bottom head portion includes a first upper extending wall connected to said first inner depending wall of said top head portion by said friction weld and a second upper extending wall connected to said second inner depending wall of said top head portion by said friction weld.

5. The piston head of claim 1, wherein each of said support portions includes a transverse bore for receiving the pin, said second cooling gallery including an opening facing said support portions.

6. The piston head of claim 1, wherein said second cooling gallery is closed on all sides.

7. The piston head of claim 1, wherein said second cooling gallery extends annularly completely around an axis of the piston head.

8. A piston head for an articulated piston assembly including a skirt connected to the head by a pin, comprising:

a top head portion having an upper wall, a depending outer wall extending from said upper wall, a first inner depending wall positioned a spaced transverse distance from said depending outer wall, a first cooling gallery positioned between said depending outer wall and said first inner depending wall, a second inner depending wall positioned a spaced transverse distance from said first inner depending wall and a second cooling gallery positioned between said first inner depending wall and said second inner depending wall, said top head portion including an outer diameter, said first and said second inner depending walls each including a transverse thickness, wherein a ratio of a sum of said transverse thickness of said first inner depending wall and said transverse thickness of said second inner depending wall to said outer diameter is approximately from 2% to 8%; and a bottom head portion having a pair of support portions connected to said top head portion and spaced inwardly from said outer wall.

9. The piston head of claim 8, wherein said ratio is from 4% to 6%.

10. The piston head of claim 8, wherein said bottom head portion includes a first upper extending wall connected to said first inner depending wall of said top head portion and a second upper extending wall connected to said second inner depending wall of said top head portion.

11. The piston head of claim 8, wherein each of said support portions includes a transverse bore for receiving the pin, said second cooling gallery including an opening facing said support portions.

12. The piston head of claim 8, wherein said second cooling gallery is closed on all sides.

13. The piston head of claim 8, wherein said second cooling gallery extends annularly completely around an axis of the piston head.

14. A method of making a piston head for an articulated piston assembly, comprising the steps of:

providing a top head blank;

forming a first cooling gallery in said top head blank;

forming a second cooling gallery in said top head blank between said first cooling gallery and a central axis of the piston head, said first and said second cooling galleries separated by a first inner depending wall, said central axis and said second cooling gallery separated by a second inner depending wall;

providing a bottom head blank;

friction welding said bottom head blank to said top head blank to create a friction weld connecting said first and said second inner depending walls to said bottom head blank.

15. The method of claim 14, wherein said bottom head blank includes a first upper extending wall for connection to said first inner depending wall of said top head blank by said friction weld and a second upper extending wall for connection to said second inner depending wall of said top head blank by said friction weld.

16. The method of claim 14, further including the step of machining said first and said second inner depending walls to a respective predetermined transverse thickness prior to friction welding.

17. The method of claim 16, wherein said top head blank includes an outer diameter, wherein a ratio of a sum of said predetermined transverse thickness of said first inner depending wall and said predetermined transverse thickness of said second inner depending wall to said outer diameter is approximately from 2% to 8%.

18. The method of claim 14, wherein said bottom head blank includes a first upper extending wall for connection to said first inner depending wall of said top head blank by said friction weld and a second upper extending wall for connection to said second inner depending wall of said top head blank by said friction weld, further including the step of machining said first and said second upper extending walls to a respective predetermined transverse thickness prior to friction welding, wherein said top head blank includes an outer diameter, wherein a ratio of a sum of said predetermined transverse thickness of said first upper extending wall and said predetermined transverse thickness of said second upper extending wall to said outer diameter is approximately from 2% to 8%.

19. The method of claim 14, further including the steps of forming said top head blank and said bottom head blank by forging and forming a central recess adjacent said second inner depending wall, said top head blank including a combustion chamber formed on an opposite side from said central recess.

20. The method of claim 17, wherein said ratio is from 4% to 6%.

21. The method of claim 14, wherein each of said support portions includes a transverse bore for receiving the pin, said second cooling gallery including an opening facing said support portions.

22. The method of claim 14, wherein said second cooling gallery is closed on all sides.

23. The method of claim 14, wherein said second cooling gallery extends annularly completely around an axis of the piston head.

* * * * *